US009755940B2

(12) United States Patent
Anastasi et al.

(10) Patent No.: US 9,755,940 B2
(45) Date of Patent: Sep. 5, 2017

(54) SYNCHRONIZATION OF DATA FOR COLLIDING BODIES

(71) Applicant: Microsoft Technology Licensing, LLC, Redmond, WA (US)

(72) Inventors: Marco Anastasi, Edinburgh (GB); Maurizio Sciglio, Edinburgh (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 14/880,236

(22) Filed: Oct. 11, 2015

(65) Prior Publication Data

US 2017/0104661 A1 Apr. 13, 2017

(51) Int. Cl.
*H04L 12/26* (2006.01)
*H04L 29/06* (2006.01)

(52) U.S. Cl.
CPC ........... *H04L 43/106* (2013.01); *H04L 67/42* (2013.01)

(58) Field of Classification Search
None
See application file for complete search history.

(56) References Cited

U.S. PATENT DOCUMENTS

| 6,292,834 | B1 | 9/2001 | Ravi et al. |
| 7,111,006 | B2 | 9/2006 | Vange et al. |
| 7,129,951 | B2* | 10/2006 | Stelly, III ............... G06T 17/20 345/474 |
| 7,376,747 | B2 | 5/2008 | Hartop |
| 2002/0059170 | A1 | 5/2002 | Vange |
| 2010/0029384 | A1* | 2/2010 | Andersen ............... A63F 13/10 463/32 |
| 2011/0077923 | A1* | 3/2011 | Bond ..................... A63F 13/10 703/2 |
| 2012/0030148 | A1* | 2/2012 | Putzolu .................. A63F 13/10 706/10 |

* cited by examiner

*Primary Examiner* — Anh Ngoc Nguyen
(74) *Attorney, Agent, or Firm* — Lee & Hayes, PLLC (57) ABSTRACT

On a server, a collision handler is called by a physics simulation engine to categorize a plurality of rigid bodies in some simulation data as either colliding or not colliding. The simulation data relates to a triggering event involving the plurality of rigid bodies and is generated by a simulation of both gravitational trajectories and collisions of rigid bodies. Based on the categorization and the simulation data, a synchronization engine generates synchronization packets for the colliding bodies only and transmits the packets to one or more client computing devices configured to perform a reduced simulation function.

20 Claims, 7 Drawing Sheets

SYNCHRONIZATION OF DATA FOR COLLIDING BODIES

BACKGROUND

Computer simulation of large-scale physics events, such as the destruction of an entire building or group of buildings, is computationally expensive because of the large number of objects (e.g. individual fragments) involved. In many examples, more objects are required in order to achieve realistic destruction than can be handled on a single compute device and so the destruction which is simulated needs to be approximated or limited in some way.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

On a server, a collision handler is called by a physics simulation engine to categorize a plurality of rigid bodies in some simulation data as either colliding or not colliding. The simulation data relates to a triggering event involving the plurality of rigid bodies and is generated by a simulation of both gravitational trajectories and collisions of rigid bodies. Based on the categorization and the simulation data, a synchronization engine generates synchronization packets for the colliding bodies only and transmits the packets to one or more client computing devices configured to perform a reduced simulation function.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, when simulating a large-scale physics event more objects may be required in order to achieve realistic destruction than can be handled on a single compute device and so the simulation may be performed on a server or group of distributed servers and the results of the simulation may then be communicated to the client computing device. However, the large number of objects involved in the simulation means that there is a large amount of data that needs to be transmitted to the client (e.g. all the data will not fit into a single frame). Where a client has to wait to receive all the transmitted data this may introduce artefacts which impair the user experience. For example, the delay may introduce pauses in the simulation as observed by a user of the client computing device (e.g. a player of a computer game which includes the large-scale physics event) and this significantly impairs the user experience as the simulation appears to stop and start (e.g. it is jerky).

Figure 1:
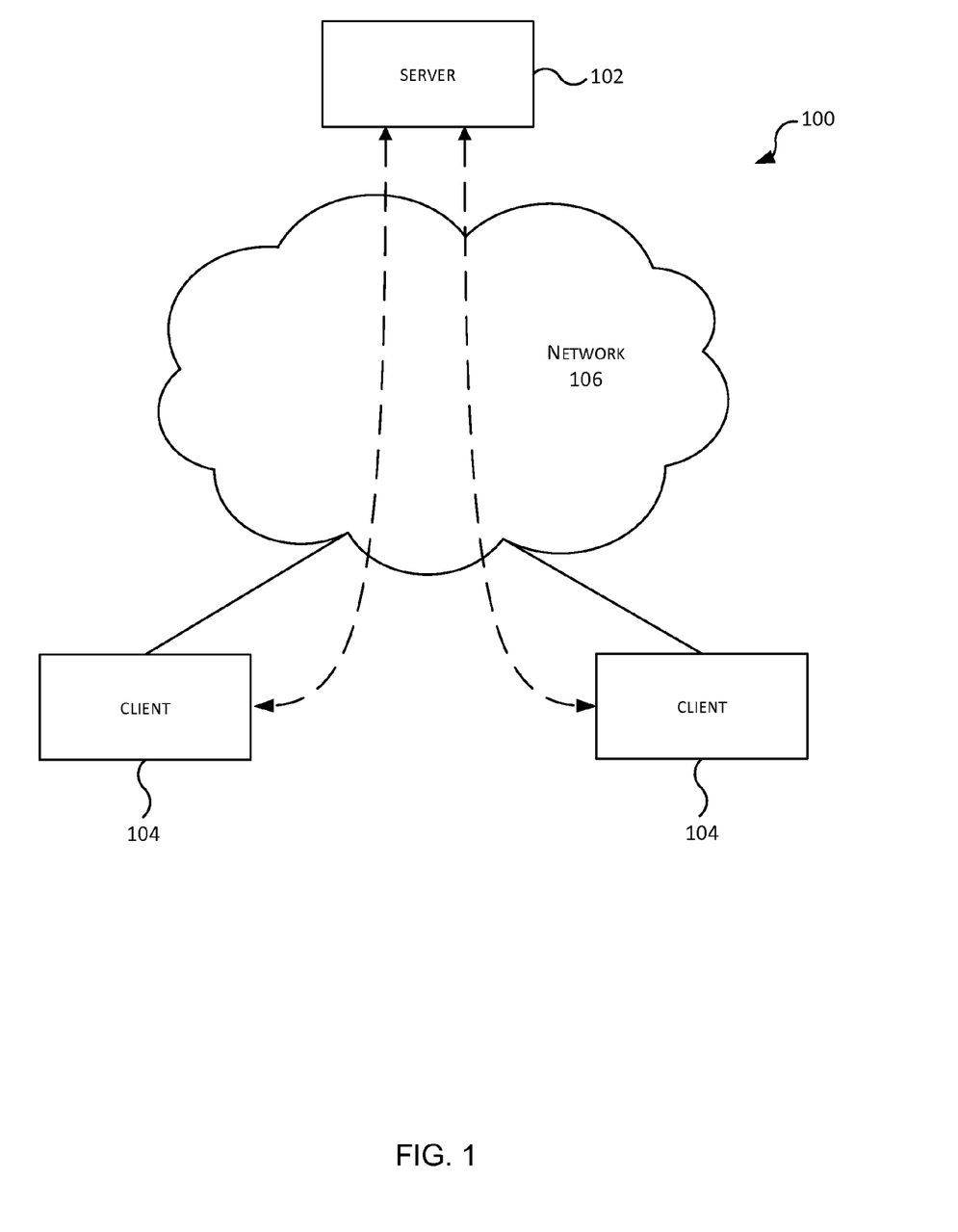
FIG. 1 is a schematic diagram of a system comprising a server connected to one or more client computing devices.

FIG. 1 is a schematic diagram of a system 100 comprising a server 102 connected to one or more client computing devices 104 via a network 106. As described above, if the server 102 performs simulation of a large-scale physics event (such as simulation of a large explosion) then there is a lot of data that needs to be transmitted to the client computing device(s) 104 in order that they can render computer graphics showing the particular event. If the data cannot fit within a single frame (e.g. if more data is produced in a 33 ms frame than can be transmitted in 33 ms) delays are introduced which results in the user experience becoming jerky. Additionally, the available bandwidth for the last mile of the link to each client computing device 104 can vary significantly during a session due to extra network load from other processors (e.g. another user in the same home starting up a video streaming service on a different computing device which shares the same access network, e.g. the same Wi-Fi™ network and the same link from the home to the curbside box).

The embodiments described below are not limited to implementations which solve any or all of the disadvantages of known simulation systems and methods.

Described herein are systems and methods for performing simulation of large-scale physics events (although the systems may also be used for simulation of smaller scale events). The physics simulation is performed on both the server and the client and the physics simulation on the client is kept in synchronization with the simulation on the server (which is the authoritative or master physics simulation). It is not possible just to initiate the physics simulation independently on the server and the client with the same input parameters and then assume that the simulations will proceed identically because physics simulations are not entirely predictable as the simulation involves use of random numbers and furthermore, as described above, the simulation of a large-scale physics event may be too computationally intense to be performed on a single client computing device.

In order to reduce the computational load on the client computing device, a reduced physics simulation is performed on the client by disabling (or otherwise not performing) collision detection. Consequently, the physics engine running on the client computing device simulates the motion of rigid bodies that are not subject to external forces other than gravity (i.e. such that they follow purely ballistic/gravitational trajectories, where the term 'ballistic' encompasses additional forces such as drag, wind, etc. as well as gravity). The server runs a fully authoritative physics simulation and provides synchronization data to the client relating only to rigid bodies to which external forces (other than gravity) are applied, e.g. rigid bodies which are in collision with another object and other triggering events which initiate motion/destruction (e.g. damage events) because the large-scale physics events typically relate to the destruction of objects (which are large in scale because there are a large number of objects as a result of fragmentation of objects into many smaller pieces). In the context of physics simulations for computer gaming, a damage event may be triggered by a player or by a scripted event and may, for example, comprise a player shooting an object (where this may not strictly be considered a collision if the missile/bullet isn't itself modelled).

The simulation of ballistic/gravitational trajectories which is performed on the client device can be performed using limited computation processing resources (i.e. at low CPU expense); however, the use of synchronization enables the full, detailed simulation to be rendered on the client computing device. As a consequence of some of the simulation being performed on the client computing device, the amount of data that needs to be sent to the client device is reduced significantly (e.g. by around 20%).

The method described herein may be referred to as a 'hybrid synchronization model' because the server is authoritative and performs the full physics simulation while the client performs a reduced simulation where collisions between physical bodies are disabled. Under these conditions, unless a physical body is subject to external forces (other than gravity), its position will follow a purely ballistic/gravitational trajectory. Using this hybrid model, the server does not send any synchronization data to clients for bodies that are following a gravitational trajectory which results in a significant saving in bandwidth usage.

Figure 2:
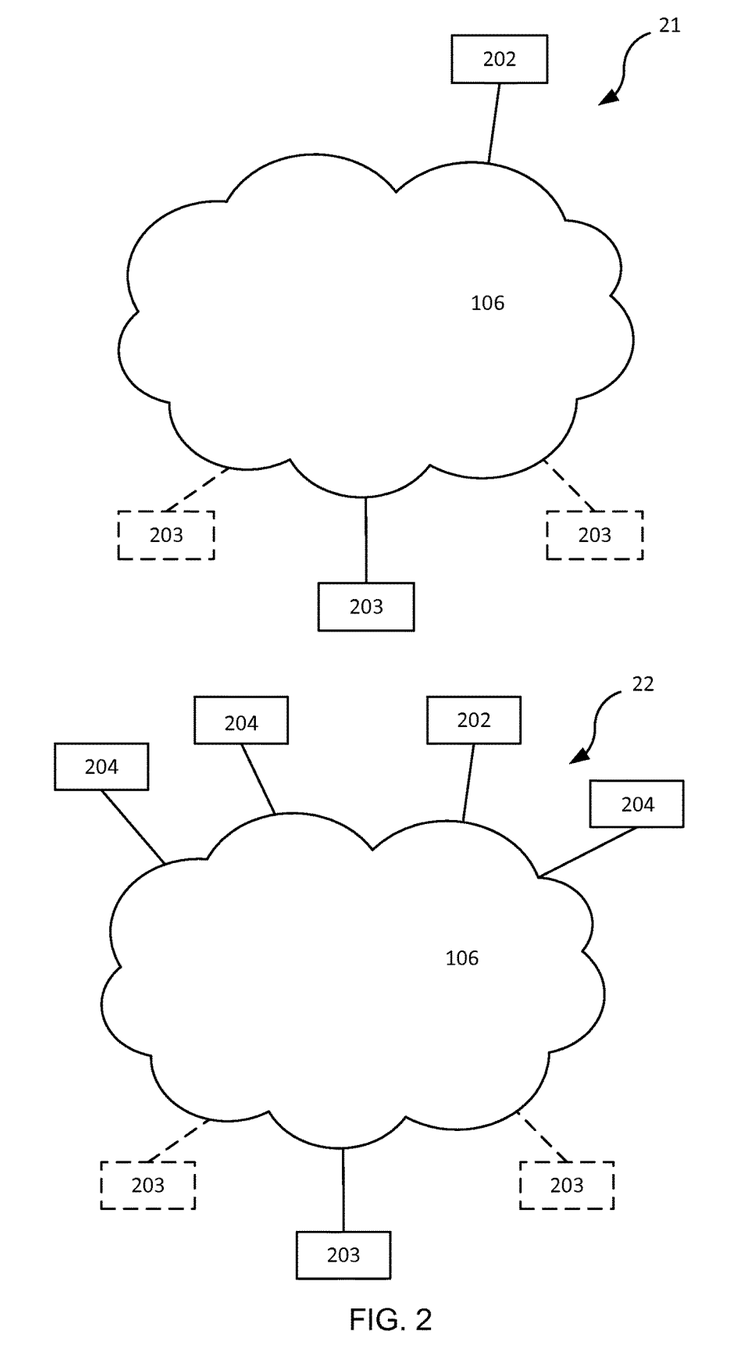
FIG. 2 shows two further example systems.

FIG. 2 shows two example systems 21, 22. The first example system 21 comprises a single server 202 which performs the authoritative physics simulation and one or more client devices 203. As described above, each client device 203 performs physics simulation of ballistic/gravitational trajectories and collision detection is not performed on a client device. A system comprising multiple client devices 203 may be used to render the same simulation on multiple client devices 203 (e.g. where the users are playing the same game). Where multiple users are playing a multi-player game, the methods described herein can be used to keep the simulation synchronized between the server 202 and all the clients 203 which may be important if the users interact in the virtual world and/or are in real-time communication with each other (e.g. via a voice channel) whilst playing the game.

The second example system 22 in FIG. 2 comprises a plurality of servers 202, 204 and one or more client devices 203. Such a system may be used where the physics simulation is distributed across multiple servers 204 (e.g. to increase the computational power available to perform the simulation) and in such an example, a single server 202, which may be referred to as the 'game server', aggregates the results from the simulations performed on each of the physics servers 204 and hence has full visibility of the physics simulation. Again the system may be used to render the same simulation on multiple client devices 203.

Figure 3:
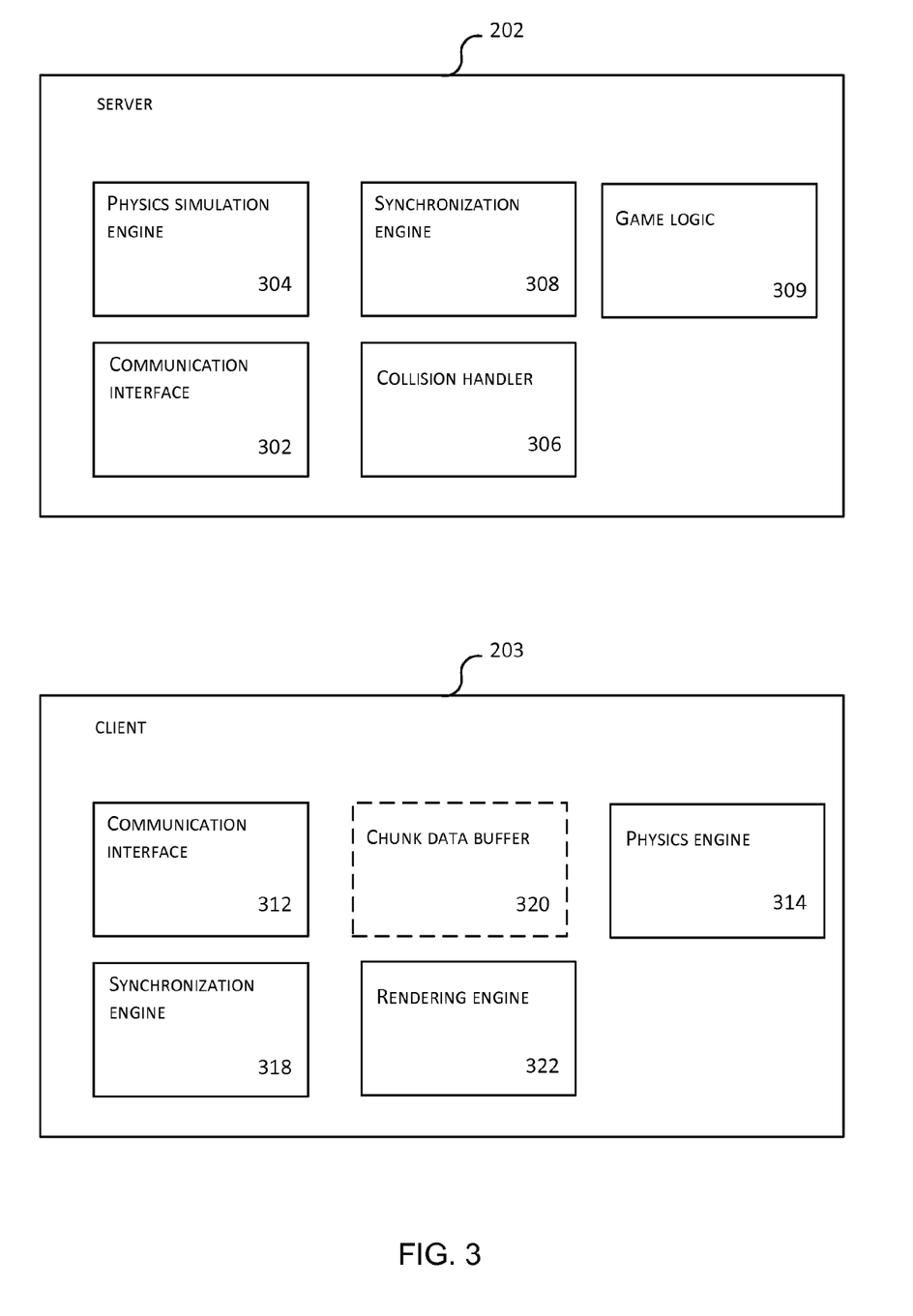
FIG. 3 shows schematic diagrams of an example server and an example client device.

FIG. 3 shows schematic diagrams of a server 202 (e.g. the single server in the system 21 or the game server in the system 22 in FIG. 2) and a client computing device 203.

The server 202 comprises a communication interface 302 via which the server 202 can communicate via the network 106 with other devices, such as other servers 204 and/or client devices 203. The server 202 also comprises a physics simulation engine 304 which has access to data from the full authoritative physics simulation. Depending upon the particular implementation, the physics simulation engine may be configured to perform the full authoritative physics simulation (e.g. as in system 21) or to aggregate simulation results generated by physics engines on one or more other servers 204 (e.g. as in system 22). In some examples, the server 202 may perform some of the full authoritative physics simulation and aggregate the results with simulation results generated by physics engines on one or more other servers 204. Irrespective of whether the physics simulation is performed on the server 202 or on other servers 204, the physics simulation engine 304 has full visibility of the authoritative physics simulation.

The server 202 also comprises a collision handler 306 which is configured to determine on a frame by frame basis whether an object is involved in a collision or not. If an object is determined to have been involved in a collision, the object is flagged and this is referred to herein as the object being marked as 'dirty'. These flags are set and acted upon on a frame by frame basis as described in more detail below. In order to determine if a chunk is dirty, the collision handler 306 is called by the physics simulation engine 304 which provides the full simulation data to the collision handler 306.

The server 202 also comprises a synchronization engine 308 which is configured to provide synchronization packets for transmission to a client device via the communication interface 302. The synchronization engine 308 may also be referred to as a 'chunk distribution manager' as it distributes data about chunks (where the term 'chunk' is used herein synonymously with 'object' and 'rigid body'). Each frame the synchronization engine 308 identifies all those chunks that have been marked as dirty, retrieves their properties (i.e. linear velocity, angular velocity, position and orientation) and prepares the data packets to be sent to the client device 203. Each data packet contains a timestamp that allows the client device 203 to apply the chunk update at the correct time and the timestamp may also be used to detect and address network issues.

The server 202 also comprises game logic 309. The game logic 309 triggers damage events and communicates these to the physics simulation engine 304.

The client computing device 203 comprises a communication interface 312 via which the client computing device 203 can communicate via the network 106 with other devices, such as the server 202 (and potentially other client devices 203).

The client computing device 203 also comprises a synchronization engine 318 which is configured to insert synchronization packets which have been received from the server 202 via the communication interface 312 into the reduced physics simulation running on the client computing device 203. The synchronization engine 318 may also be referred to as a 'chunk event dispatcher' as it dispatches data about chunks into the local simulation. The synchronization engine 318 uses the timestamps in the received data packets to insert the chunk data into the local simulation at the right time and the local, client, timestamps are synchronized to the server when a client connects to the server and the simulation starts. The timestamps may also be used to identify out-of-order packets which might otherwise corrupt the local simulation.

The local, reduced simulation is performed by the physics engine 314 in the client device 203. As described above, only ballistic/gravitational trajectories are simulated and data on colliding objects is provided by the server 202 in the form of synchronization packets which may also be referred to as 'chunk data'. The chunk data is used to overwrite the transform (e.g. position, orientation and scale) and velocity (both linear and angular) of an object within the simulation. Subsequent simulation of the object is then based on the new transform and velocity.

The client computing device 203 further comprises a rendering engine 322 which is configured to generate a graphical representation of the simulation results (as generated by the physics engine 314) for display to a user.

As shown in FIG. 3, the client computing device 203 may also comprise a buffer 320 in which synchronization packets may be stored between their receipt and their injection into the local simulation under the control of the synchronization engine 318. The use of a buffer 320 provides a level of robustness of the system with respect to network defects (e.g. such that the system can accommodate variations in the time taken for a packet to travel from the server to the client) and the buffer may also be used to amortize the initial spike in data transmission caused by a new triggering event (e.g. a collision or a damage event) occurring on the server (and hence a step change in the number of objects for which data is being transmitted from the server to the client).

The operation of the server 202 and client computing device 203 and their component parts can be described in more detail with reference to the example flow diagram shown in FIG. 4. As described above, at the start of a simulation, the timestamps of the server 202 and the client 203 are synchronized (block 401). Initially a group of objects are at rest (block 402) and so no local simulation is performed on the client computing device 203 in relation to this group of objects. Simulation may be occurring for other objects in a computer generated environment/scene and multiple instances of the method of FIG. 4 may be performed at any time for different groups of objects within a computer generated environment (where a group is not fixed and refers only to a collection of objects which are affected by a particular triggering event).

In response to a triggering event on the server 202 (block 404) e.g. when a player shoots a destructible object a damage event is triggered by the game logic 309 and the event is communicated to the physics simulation engine 304, a simulation operation is performed on the server (block 406), e.g. in the physics simulation engine 304 or a physics engine on a separate server 204. At the end of the simulation operation (which corresponds to a single frame), the chunks involved in the event (i.e. the group of objects referred to above) will have their state (e.g. transform and velocities) set correctly and the collision handler 308 flags one or more chunks as 'dirty' (block 408), i.e. where a chunk has been involved in a collision in the simulation operation (and hence in the frame).

The synchronization engine 308 identifies all chunks that have been set to dirty earlier in the same frame (e.g. by making a list of all the chunks that have been marked as dirty by the collision handler in block 408) and prepares chunk data to be sent to the client (block 409). The prepared data is then sent to the client via the communication interface 302 and this data, or an accompanying signal, triggers a damage event on the client (block 411). As described above, each packet of chunk data which is sent (in block 411) comprises a timestamp as well as the velocities and transform of the dirty chunk(s) and a packet may comprise data for a single chunk or data for multiple related chunks (e.g. to minimize the overhead of sending the timestamp).

The chunk data which is prepared (in block 409) and sent (in block 411) may relate to all the chunks that have been set to dirty. Alternatively, a synchronization scheme may be used to further reduce the amount of data which is transmitted (in block 411) and depending on the implementation this may also reduce the amount of data prepared (in block 409) or the data reduction may occur subsequently and only reduce the amount of data sent (in block 411).

In addition to, or as part of the synchronization scheme, a throttling scheme may also be implemented to reduce the required bandwidth between the server 202 and client 203. The throttling scheme may limit the number of chunks that are synchronized each frame and consequently it may take more than one frame to send the data about the dirty chunks to the client. In various examples, the throttling scheme may impose a variable limit on the number of chunks that are synchronized each frame where this limit is dependent upon the available bandwidth between the server 202 and the client 203 (e.g. with a higher limit being used where the available bandwidth is higher and a lower limit being used where the available bandwidth is lower). The available bandwidth may be communicated to the server 202 by the client 203 or may be inferred based on data communications between the server 202 and the client 203 and where a server 202 communicates with multiple clients, the available bandwidth (and hence the limit imposed by a throttling scheme) may be different for different clients.

The client 203 receives the chunk data (sent in block 411) and response to the trigger (sent in block 411) and if the object is destructible, the physics engine 314 fractures the destructible actor into a plurality of chunks (block 420), e.g. the destructible object being shot by the player is broken into multiple parts referred to as chunks.

After (e.g. immediately after) fracturing the destructible actor in the physics engine 314 into a plurality of chunks (in block 420), or immediately after receiving the data (sent in block 411) for non-destructible objects, the synchronization engine 318 in the client 203 applies the initial state received from the server 202 (e.g. the initial transform and velocities of the chunks as sent in block 411) to the local chunks (block 422) i.e. the chunks being processed in the physics engine 314 in the client 203, and gravitational simulation of the chunks starts in the physics engine 314 on the client 203 (block 424) and continues frame by frame. In parallel, the simulation continues frame by frame in the physics simulation engine 304 on the server (block 426) and as shown in FIG. 4, following the simulation of a frame (block 428) by the physics simulation engine 304 on the server 202, the collision handler 306 sets any chunks that collided in the frame to dirty (block 430). Data relating to the dirty chunks (as identified in block 430) is prepared by the synchronization engine 308 (block 431, in a similar manner to block 409 described above) and sent to the client (block 432) via the communication interface 302.

The synchronization engine 318 in the client 318 uses the local timestamps (as synchronized to the server in block 401) to determine when to apply chunk data to the simulation being performed by the physics engine 314 (block 436).

Figure 4:
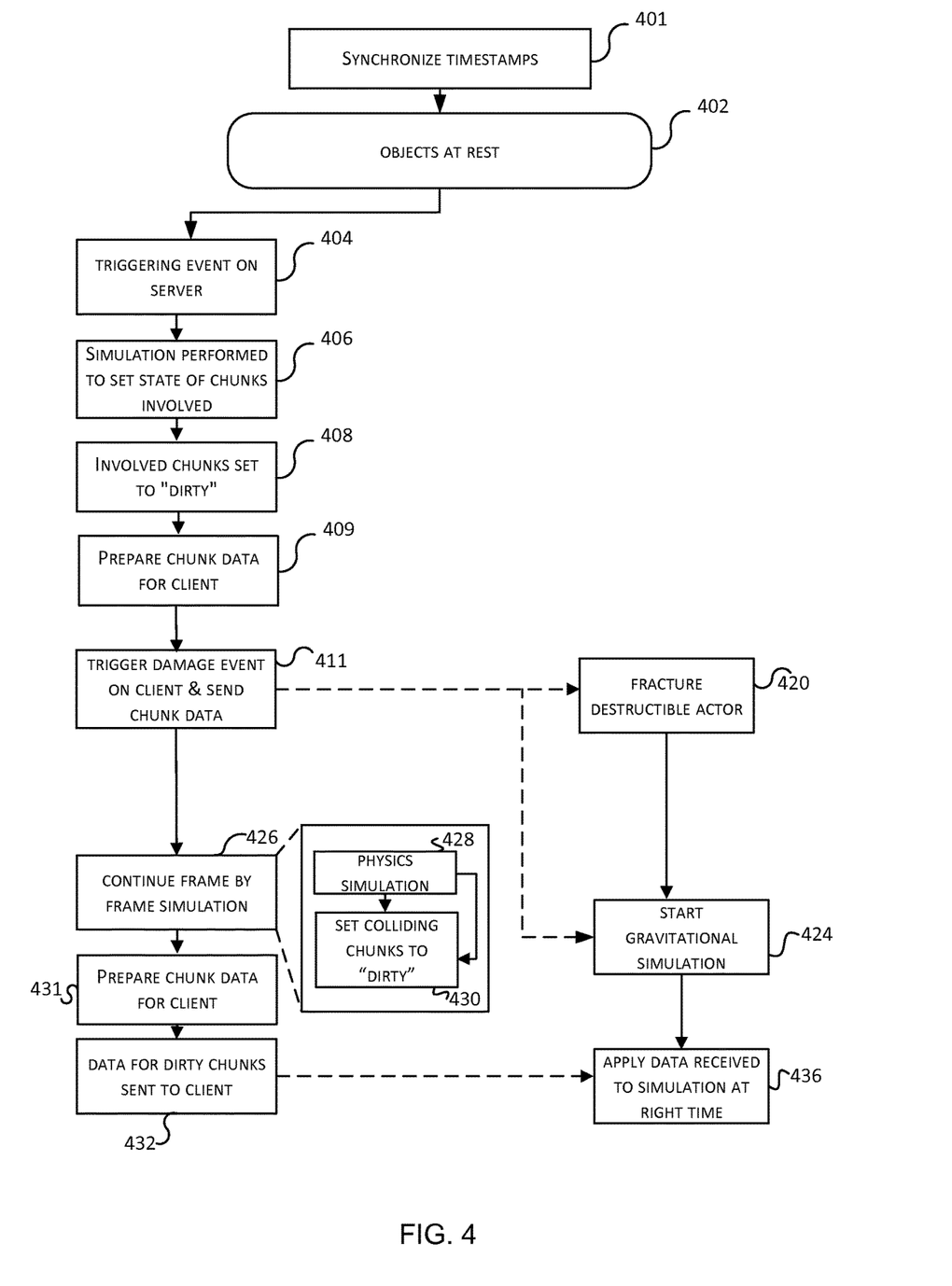
FIG. 4 is a flow diagram of an example method of operation of the server and client device shown in FIG. 3.

FIG. 5 shows a further example flow diagram which is a variation on that shown in FIG. 4 and described above and the example shown in FIG. 5 uses a chunk data buffer 320 in the client computing device 203.

Figure 5:
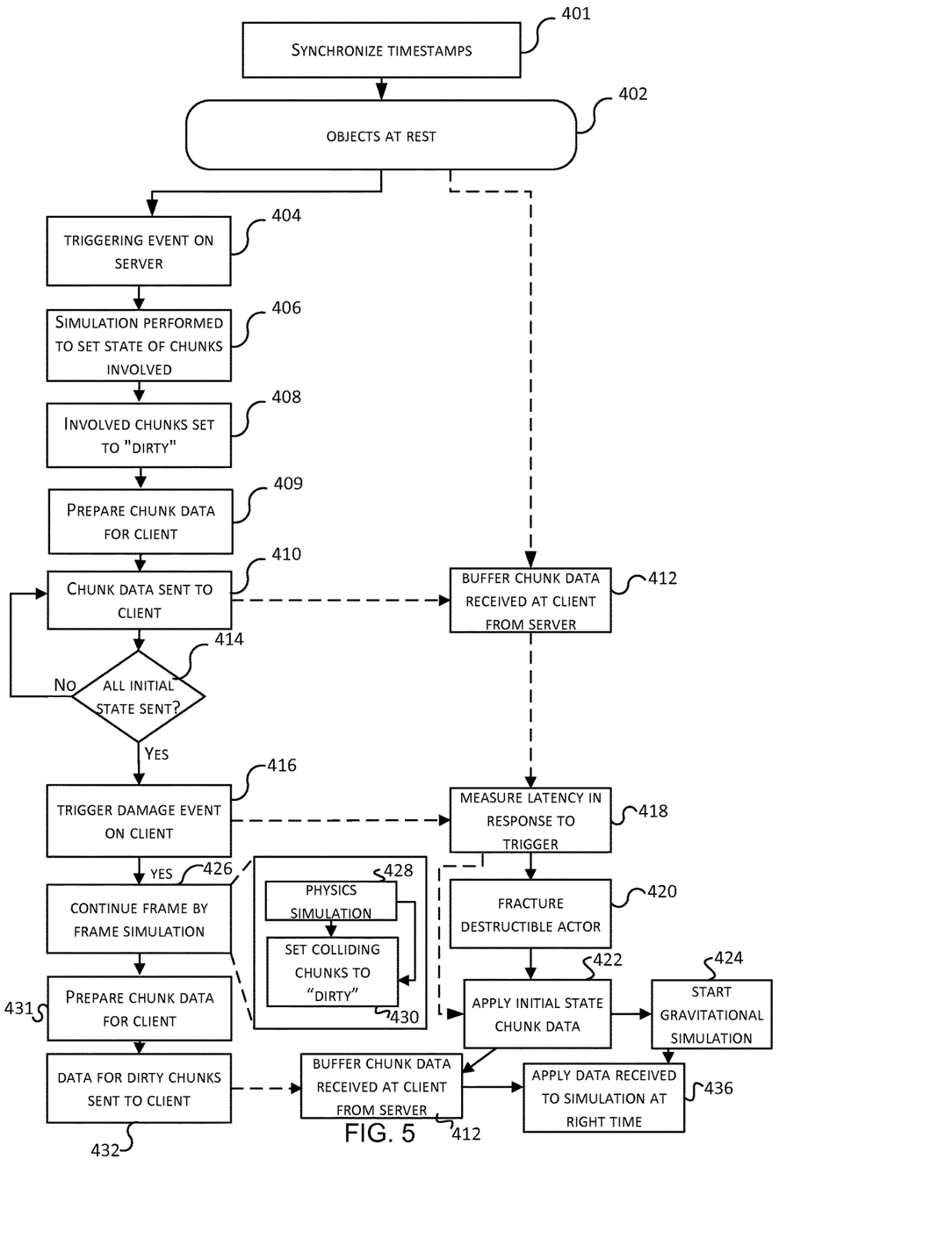
FIG. 5 is a flow diagram of another example method of operation of the server and client device shown in FIG. 3.

Initially the method proceeds as described above with reference to FIG. 4. As described above, whilst FIG. 5 relates to one group of objects (involved in the triggering event in block 404) simulation may be occurring for other objects in a computer generated environment/scene and multiple instances of the method of FIG. 5 may be performed at any time for different groups of objects within a computer generated environment (where a group is not fixed and refers only to a collection of objects which are affected by a particular triggering event). In the method of FIG. 5, however, the different groups may not be completely independent because the latency may only be measured (in block 418) for the first triggered event and then that latency may be applied to all subsequent events for the same and/or different groups of objects.

As shown in FIG. 5, the sending of the initial chunk data (block 410) is decoupled from the triggering signal (sent in block 416). The prepared data (from block 409) is sent to the client via the communication interface 302 (block 410).

As described above, the chunk data which is prepared (in block 409) and sent (in block 410) may relate to all the chunks that have been set to dirty. Alternatively, a synchronization scheme may be used to further reduce the amount of data which is transmitted (in block 410) and depending on the implementation this may also reduce the amount of data prepared (in block 409) or the data reduction may occur subsequently and only reduce the amount of data sent (in block 410). In addition to, or as part of the synchronization scheme, a throttling scheme may also be implemented to reduce the required bandwidth between the server 202 and client 203 (as described above).

The client 203 receives the chunk data (sent in block 410) via the communication interface 312 and stores it in the chunk data buffer 320 where provided (block 412). It may take more than one frame for the initial state (i.e. the state for all the dirty chunks involved in the triggering event) to be received at the client 203, e.g. where a throttling scheme is used.

When all the initial state has been sent from the server and delivered to the client ('Yes' in block 414), the synchronization engine 308 in the server 302 instructs the client 203 to trigger a damage event in its simulation (performed by the physics engine 314). In response to the trigger, the synchronization engine 318 in the client 203 measures the server-client latency (block 418), which is the time taken to transfer the initial state from the server to the client, and the physics engine 314 fractures the actor (if it is destructible) into a plurality of chunks (block 420), e.g. the destructible object being shot by the player is broken into multiple parts referred to as chunks.

After (e.g. immediately after) fracturing the destructible actor in the physics engine 314 into a plurality of chunks (in block 420) or after measuring the latency (in block 418) if the object is not destructible, the synchronization engine 318 in the client 203 applies the initial state (e.g. transform and velocity) received from the server 202 to the local chunks (block 422) i.e. the chunks being processed in the physics engine 314 in the client 203. In applying the initial state (in block 422), the simulation engine 314 delivers the chunk data for the initial state to the physics engine 314.

Once the initial state has been applied (in block 422), gravitational simulation of the chunks starts in the physics engine 314 on the client 203 (block 424) and continues frame by frame, as described above.

As with the initial state data (sent in block 410), the chunk data that is received at the client via the communication interface 312, may be stored in the chunk data buffer 320 (block 412). The synchronization engine 318 in the client 318 uses the latency (as calculated in block 418) and the local timestamps (as synchronized to the server in block 401) to determine when to apply chunk data to the simulation being performed by the physics engine 314 (block 436).

In the example described above with reference to FIG. 5, the local simulation (i.e. the simulation on the client 203) of the actor only starts when all its initial state (i.e. the initial state of all the chunks involved in the event) is received from the server. This buffering scheme introduces an adaptive latency that is then taken into account when replaying chunk events (e.g. by applying the latency as measured in block 418 to the timestamps in subsequently received chunk data). Alternatively, a fixed latency may be used (omitting the latency calculation in block 418).

In the methods shown in FIGS. 4 and 5, the methods may be used to synchronize generic rigid bodies, which may include destructible objects and non-destructible objects. In other examples, however, the methods may only be applied to destructible objects and not to other, non-destructible, rigid bodies.

Although the description of FIGS. 4 and 5 above refers to the application of chunk data to the simulation on the client, where this chunk data comprises both the transform and velocity data, in some examples (e.g. where the simulation on the client is sufficiently accurate) it may not be necessary to always synchronize both the transform and the velocity and instead just one of the two (e.g. transform or velocity) may be synchronized. The chunk data may, therefore, be comprised of a timestamp (one per chunk or one per packet, as described above), a chunk identifier, a position (including orientation) and/or velocities (e.g. in an example it may comprise the transform and not the velocities).

Figure 6:
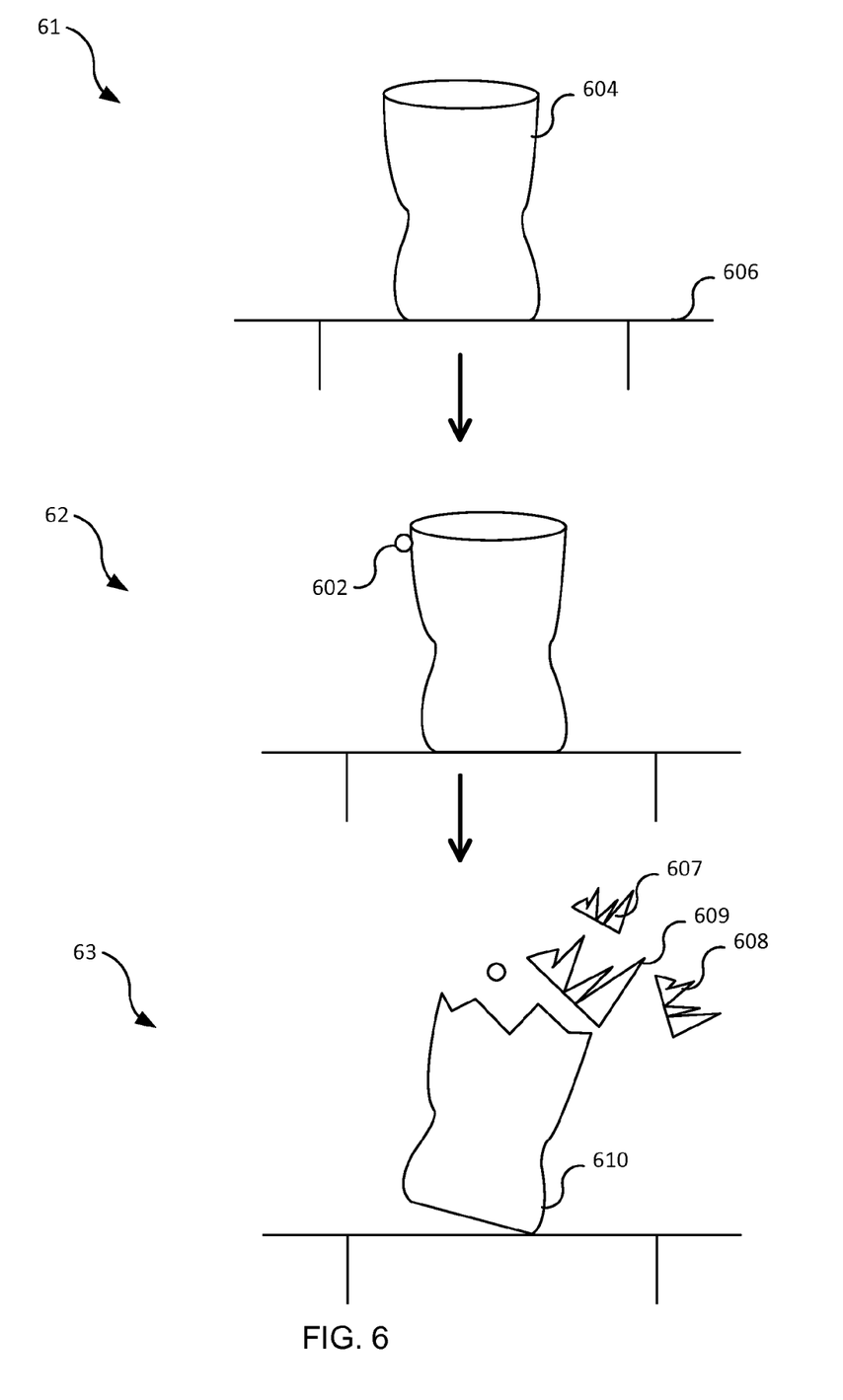
FIG. 6 is a graphical representation of a damage event which may be simulated using the method of FIG. 4 or 5.

FIG. 6 shows a graphical representation of a damage event in which a projectile 602 hits a vase 604 which is sitting on a table 606 (where as described above, this damage event is triggered by the game logic 309). The first diagram 61 shows the scene prior to the event. The second diagram 62 shows the moment when the damage event is triggered, i.e. when the projectile 602 impacts on the vase 604 and the third diagram 63 shows the vase 604 (which is a destructible object) fracturing into four pieces 607-610. For this example event, the simulation performed to set the initial state of the chunks involved (in block 406) will remove chunk 604 (the whole vase) from the scene and replace it with its constituent fragments (chunks 607-610) and these chunks 607-610 will be set to dirty (in block 408). On the client 203, the destructible actor which is fractured (in block 420) is the vase 604.

The physics simulation engine 304, collision handler 306, game logic 309 and synchronization engine 308 in the server 202 may be implemented in software or the functionality described may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 7:
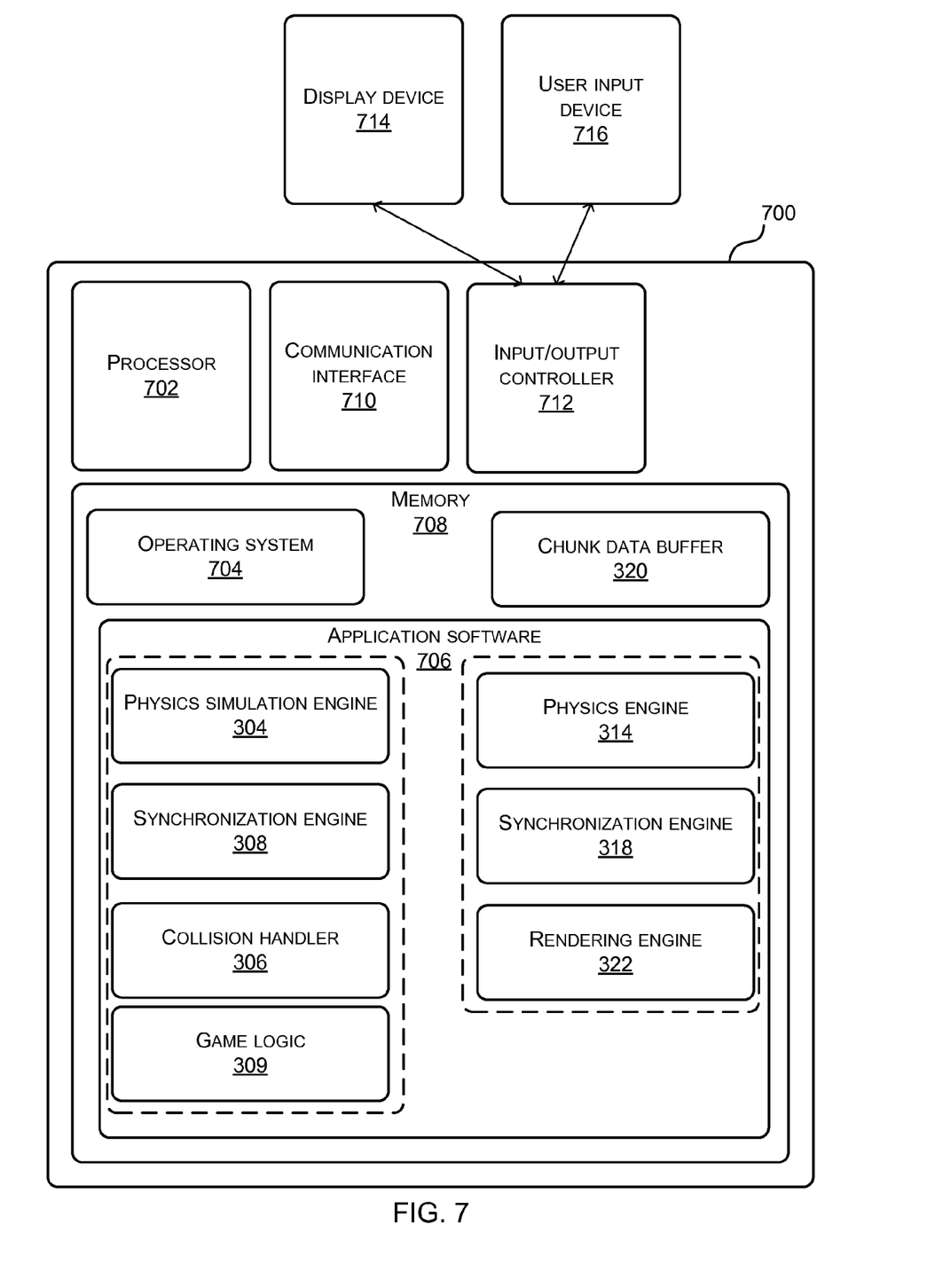
FIG. 7 illustrates an exemplary computing-based device which may perform elements of the method shown in FIG. 4.

FIG. 7 illustrates various components of an exemplary computing-based device 700 which may be implemented as any form of a computing and/or electronic device, and in which embodiments of the method of FIG. 4 or 5 may be implemented. In particular, the computing-based device 700 may represent a server 202 or a client device 203.

Computing-based device 700 comprises one or more processors 702 which may be microprocessors, controllers or any other suitable type of processors for processing computer executable instructions to control the operation of the device in order to implement the functionality of the server 202 or client device 203. In some examples, for example where a system on a chip architecture is used, the processors 702 may include one or more fixed function blocks (also referred to as accelerators) which implement a part of the method of FIG. 4 or 5 in hardware (rather than software or firmware).

Platform software comprising an operating system 704 or any other suitable platform software may be provided at the computing-based device to enable application software 706 to be executed on the device. Depending upon the implementation, the application software may include the physics simulation engine 304, synchronization engine 308, game logic 309 and/or collision handler 306 for a server 202 and the physics engine 314, synchronization engine 318 and/or rendering engine 322 for a client device 203.

When implemented in software, the physics simulation engine 304 comprises computer executable instructions which, when executed by the processor 702, cause the processor to perform a physics simulation (e.g. as in blocks 406 and 426 of FIGS. 4 and 5) or to receive physics simulation results from a separate server which performs the physics simulation (via a communication interface 710).

When implemented in software, the collision handler 306 comprises computer executable instructions which, when executed by the processor 702, cause the processor to flag chunks involved in a collision as dirty (e.g. as in block 408 and 430 of FIGS. 4 and 5).

When implemented in software, the synchronization engine 308 comprises computer executable instructions which, when executed by the processor 702, cause the processor to identify those chunks which have been flagged as dirty and prepare the chunk data (e.g. as in blocks 408-409 and 431 of FIGS. 4 and 5). The synchronization engine 308 may also apply a throttling scheme. Furthermore, the synchronization engine 308 comprises computer executable instructions which, when executed by the processor 702, cause the processor to instruct the client 203 to trigger a damage event in its simulation (e.g. as in block 416).

When implemented in software, the game logic 309 comprises computer executable instructions which, when executed by the processor 702, cause the processor to trigger damage events (e.g. as in block 404 of FIGS. 4 and 5).

When implemented in software, the client physics engine 314 comprises computer executable instructions which, when executed by the processor 702, cause the processor to perform gravitational simulations (e.g. as in block 424 of FIGS. 4 and 5).

When implemented in software, the client synchronization engine 318 comprises computer executable instructions which, when executed by the processor 702, cause the processor to input the chunk data received from the server into the physics engine 314 at the start of a simulation sequence and at the appropriate times during ongoing simulation (e.g. in blocks 422 and 436 of FIGS. 4 and 5), where the timing is determined based on the timestamps in the chunk data packets received from the server and the local (i.e. client generated) timestamps. As described above, the latency (whether fixed or measured in block 418) may also be used in determining the timing.

When implemented in software, the rendering engine 322 comprises computer executable instructions which, when executed by the processor 702, cause the processor to generate a graphical representation of the output from the client physics engine 322. The graphical representation may, for example, be a rendering of a scene simulated by the physics engine 322, e.g. the smashing of the vase in the example shown in FIG. 6, the destruction of a building, etc. The graphical representation may, for example, be provided as part of a computer game in which case the client and/or server may also comprise a game engine which manages the gameplay.

The computer executable instructions may be provided using any computer-readable media that is accessible by computing based device 700. Computer-readable media may include, for example, computer storage media such as memory 708 and communications media. Computer storage media, such as memory 708, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 708) is shown within the computing-based device 700 it will be appreciated that the storage may be distributed or located remotely and accessed via a network or other communication link (e.g. using communication interface 710).

The computing-based device 700 may also comprises an input/output controller 712 arranged to output display information to a display device 714 which may be separate from or integral to the computing-based device 700 (e.g. where the computing-based device 700 is a client device 203). The display information may provide a graphical user interface. The input/output controller 712 may also be arranged to receive and process input from one or more devices, such as a user input device 716 (e.g. a mouse, keyboard, camera, microphone or other sensor). In some examples the user input device 716 may detect voice input, user gestures or other user actions and may provide a natural user interface (NUI). This user input may be used to interact with the simulation (e.g. to play a computer game involving the simulation). In an embodiment the display device 714 may also act as the user input device 716 if it is a touch sensitive display device. The input/output controller 712 may also output data to devices other than the display device, e.g. a locally connected printing device (not shown in FIG. 7).

Any of the input/output controller 712, display device 714 and the user input device 716 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Although the present examples are described and illustrated herein as being implemented in one of the systems shown in FIG. 2, the system described is provided as an example and not a limitation. As those skilled in the art will appreciate, the present examples are suitable for application in a variety of different types of systems comprising any number of clients and servers and which use a hybrid synchronization model as described above.

Although the collision handler 306 is described above as being implemented in the server 202, in other examples, some or all of the collision handler functionality may be implemented on another server (e.g. server 204).

A first further example provides a server configured comprising: a communication interface; a physics simulation engine configured to provide simulation data, the simulation data having been generated by a simulation of both gravitational trajectories and collisions of rigid bodies; and a synchronization engine configured to generate synchronization packets and transmit the packets via the communication interface to one or more client computing devices configured to perform a reduced simulation function, wherein the synchronization packets include data relating only to rigid bodies categorized as colliding by a collision handler.

The server may further comprise a collision handler called by the physics simulation engine and configured to categorize a plurality of rigid bodies in the simulation data as either colliding or not colliding.

In the first further example, the synchronization packets may, in various examples, not include data relating to rigid bodies categorized as not colliding.

The physics simulation engine may be further configured to perform the simulation and generate the simulation data and/or to aggregate simulation data received from other servers configured to perform the simulation.

A synchronization packet may comprise a timestamp and transform and velocity data for a number of rigid bodies categorized as colliding by the collision handler.

The synchronization engine may be further configured to limit the number of rigid bodies for which transform and velocity data is included in a synchronization packet and wherein the limit is set based on an available bandwidth between the server and the client computing device to which the synchronization packet is transmitted.

The synchronization engine may be further configured to generate and transmit synchronization packets including data defining an initial state of one or more rigid bodies categorized as colliding and then to trigger a damage event on the client computing device to which the synchronization packets are transmitted.

At least one of the physics simulation engine and the synchronization engine may be at least partially implemented using hardware logic selected from any one or more of: a field-programmable gate array, a program-specific integrated circuit, a program-specific standard product, a system-on-a-chip, a complex programmable logic device.

A second further example provides a client computing device comprising: a communication interface; a physics engine configured to perform a reduced physics simulation of a plurality of rigid bodies in a computer generated scene, the reduced physics simulation simulating only those rigid bodies which are following a gravitational trajectory and not comprising any collision detection; and a synchronization engine configured to receive synchronization packets from a server via the communication interface and to update the simulation performed by the physics engine using the received packets, wherein the synchronization packets comprise data relating to only rigid bodies in the computer generated scene which are categorized as colliding.

Collision detection functionality within the physics engine may be disabled.

The client computing device may further comprise a buffer configured to store the synchronization packets received from the server via the communication interface.

Each synchronization packet may comprise a timestamp and wherein the synchronization engine is further configured to access the buffer and input data from the synchronization packets into the simulation performed by the physics engine based on the timestamps.

The client computing device may further comprise a rendering engine configured to generate a graphical representation of the output from the physics engine for display to a user on a display device.

At least one of the physics engine and the synchronization engine may be at least partially implemented using hardware logic selected from any one or more of: a field-programmable gate array, a program-specific integrated circuit, a program-specific standard product, a system-on-a-chip, a complex programmable logic device.

A third further example provides a computer implemented method comprising: receiving simulation data specifying a state of a plurality of chunks involved in a triggering event; categorizing, in a collision handler on a server, each chunk as either colliding or not colliding; generating data for one or more chunks categorized as colliding, the data for a chunk comprising transform and/or velocity data for the chunk; and sending, via a communication interface, the data for the one or more chunks from the server to a client computing device for use in synchronizing a reduced physics simulation performed on the client computing device and wherein data is not sent for any chunks categorized as not colliding.

The method may further comprise: generating the simulation data specifying the initial state of the plurality of chunks involved in the damage event in a physics engine on the server.

The method may further comprise: in response to determining that all initial state data has been sent to the client computing device, sending, via the communication interface, a message to trigger a damage event within the reduced physics simulation performed on the client computing device.

The method may further comprise, for each of a plurality of subsequent frames: receiving simulation data specifying an updated state of one or more of the plurality of chunks involved in the triggering event; categorizing, in a collision handler on a server, each chunk as either colliding or not colliding; generating updated state data for one or more chunks categorized as colliding, the data for a chunk comprising an updated transform and/or an updated velocity of the chunk; and sending, via a communication interface, the updated state data for the one or more chunks from the server to the client computing device for use in synchronizing the reduced physics simulation performed on the client computing device and wherein updated state data is not sent for any chunks categorized as not colliding.

The method may further comprise: generating the simulation data specifying the updated state of one or more of the plurality of chunks involved in the triggering event in a physics engine on the server.

The method may further comprise: receiving, at the client computing device and via a second communication interface, the initial state data for the one or more chunks; and in response to a trigger message from the server, inputting the initial state data to the reduced physics simulation and starting the reduced physics simulation, wherein the reduced physics simulation comprises gravitational simulation and not collision detection.

The method may further comprise: receiving, at the client computing device and via the second communication interface, updated state data for one or more chunks and a timestamp; and inputting the updated state data to the reduced physics simulation at a time determined using the received timestamp.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A server configured comprising:
a communication interface;
a physics simulation engine configured to provide simulation data, the simulation data having been generated by a simulation of both gravitational trajectories and collisions of rigid bodies; and
a synchronization engine configured to generate synchronization packets and transmit the packets via the communication interface to one or more client computing devices configured to perform a reduced simulation function, wherein the synchronization packets include data relating only to rigid bodies categorized as colliding by a collision handler.

2. The server according to claim 1, further comprising:
the collision handler called by the physics simulation engine and configured to categorize a plurality of rigid bodies in the simulation data as either colliding or not colliding.

3. The server according to claim 1, wherein the synchronization packets do not include data relating to rigid bodies categorized as not colliding.

4. The server according to claim 1, wherein the physics simulation engine is further configured to perform the simulation and generate the simulation data and/or to aggregate simulation data received from other servers configured to perform the simulation.

5. The server according to claim 1, wherein a synchronization packet comprises a timestamp and transform and velocity data for a number of rigid bodies categorized as colliding by the collision handler.

6. The server according to claim 5, wherein the synchronization engine is further configured to limit the number of rigid bodies for which transform and velocity data is included in a synchronization packet and wherein the limit is set based on an available bandwidth between the server and the client computing device to which the synchronization packet is transmitted.

7. The server according to claim 1, wherein the synchronization engine is further configured to generate and transmit synchronization packets including data defining an initial state of one or more rigid bodies categorized as colliding and then to trigger a damage event on the client computing device to which the synchronization packets are transmitted.

8. The server according to claim 1, at least one of the physics simulation engine and the synchronization engine being at least partially implemented using hardware logic selected from any one or more of: a field-programmable gate array, a program-specific integrated circuit, a program-specific standard product, a system-on-a-chip, a complex programmable logic device.

9. A client computing device comprising:
a communication interface;
a physics engine configured to perform a reduced physics simulation of a plurality of rigid bodies in a computer generated scene, the reduced physics simulation simulating only those rigid bodies which are following a gravitational trajectory and not comprising any collision detection; and
a synchronization engine configured to receive synchronization packets from a server via the communication interface and to update the simulation performed by the physics engine using the received packets, wherein the synchronization packets comprise data relating to only rigid bodies in the computer generated scene which are categorized as colliding.

10. The client computing device according to claim 9, wherein collision detection functionality within the physics engine is disabled.

11. The client computing device according to claim 9, further comprising a buffer configured to store the synchronization packets received from the server via the communication interface.

12. The client computing device according to claim 11, wherein each
synchronization packet comprises a timestamp and wherein the synchronization engine is further configured to access the buffer and input data from the
synchronization packets into the simulation performed by the physics engine based on the timestamps.

13. The client computing device according to claim 9, further comprising a rendering engine configured to generate a graphical representation of the output from the physics engine for display to a user on a display device.

14. The client computing device according to claim 9, at least one of the physics engine and the synchronization engine being at least partially implemented using hardware logic selected from any one or more of: a field-programmable gate array, a program-specific integrated circuit, a program-specific standard product, a system-on-a-chip, a complex programmable logic device.

15. A computer implemented method comprising:
receiving simulation data specifying a state of a plurality of chunks involved in a triggering event;
categorizing, in a collision handler on a server, each chunk as either colliding or not colliding;
generating data for one or more chunks categorized as colliding, the data for a chunk comprising transform and/or velocity data for the chunk; and
sending, via a communication interface, the data for the one or more chunks from the server to a client computing device for use in synchronizing a reduced physics simulation performed on the client computing device and wherein data is not sent for any chunks categorized as not colliding.

16. The method according to claim 15, further comprising:
in response to determining that all initial state data has been sent to the client computing device, sending, via the communication interface, a message to trigger a damage event within the reduced physics simulation performed on the client computing device.

17. The method according to claim 15, further comprising, for each of a
plurality of subsequent frames:
receiving simulation data specifying an updated state of one or more of the plurality of chunks involved in the triggering event;
categorizing, in the collision handler on the server, each chunk as either colliding or not colliding;
generating updated state data for one or more chunks categorized as colliding, the data for a chunk comprising an updated transform and/or an updated velocity of the chunk; and
sending, via a communication interface, the updated state data for the one or more chunks from the server to the client computing device for use in synchronizing the reduced physics simulation performed on the client computing device and wherein updated state data is not sent for any chunks categorized as not colliding.

18. The method according to claim 17, further comprising:
generating the simulation data specifying the updated state of one or more of the plurality of chunks involved in the triggering event in a physics engine on the server.

19. The method according to claim 15, further comprising:
receiving, at the client computing device and via a second communication interface, the initial state data for the one or more chunks; and
in response to a trigger message from the server, inputting the initial state data to the reduced physics simulation and starting the reduced physics simulation, wherein the reduced physics simulation comprises gravitational simulation and not collision detection.

20. The method according to claim 19, further comprising:
receiving, at the client computing device and via the second communication interface, updated state data for one or more chunks and a timestamp; and
inputting the updated state data to the reduced physics simulation at a time determined using the received timestamp.

* * * * *